| United States Patent [19] | [11] Patent Number: 5,045,398 |
|---|---|
| Levin | [45] Date of Patent: Sep. 3, 1991 |

[54] SILICON CARBIDE PRODUCT

[76] Inventor: Harry Levin, 1983 Friar St., Woodland Hills, Calif. 91367

[21] Appl. No.: 462,260

[22] Filed: Jan. 9, 1990

Related U.S. Application Data

[60] Division of Ser. No. 153,126, Feb. 8, 1988, Pat. No. 4,900,531, which is a continuation-in-part of Ser. No. 749,661, Jun. 28, 1985, Pat. No. 4,668,493, which is a continuation-in-part of Ser. No. 618,712, Jun. 8, 1984, Pat. No. 4,737,348, said Ser. No. 749,661, is a continuation-in-part of Ser. No. 390,920, Jun. 22, 1982, abandoned, said Ser. No. 618,712, is a division of Ser. No. 390,920, Jun. 22, 1982, abandoned.

[51] Int. Cl.⁵ ............................................. B32B 33/00
[52] U.S. Cl. ..................................... 428/446; 428/408; 428/698
[58] Field of Search ............... 428/408, 446, 367, 368, 428/698, 902

[56] References Cited

U.S. PATENT DOCUMENTS

| 3,925,577 | 12/1975 | Fatzer et al. | 428/408 |
| 4,068,037 | 1/1978 | Debolt et al. | 428/368 |
| 4,226,914 | 10/1980 | Terner et al. | 428/446 |
| 4,288,495 | 9/1981 | Terner et al. | 428/446 |
| 4,373,006 | 2/1983 | Galasso et al. | 428/902 |
| 4,379,901 | 8/1983 | Warren | 428/408 |
| 4,425,407 | 1/1984 | Galasso et al. | 428/368 |
| 4,472,476 | 9/1984 | Veltri et al. | 428/408 |
| 4,476,178 | 10/1984 | Veltri et al. | 428/408 |
| 4,515,860 | 5/1985 | Holzl | 428/446 |
| 4,617,232 | 10/1986 | Chandler et al. | 428/698 |
| 4,621,017 | 11/1986 | Chandler et al. | 428/408 |
| 4,668,579 | 5/1987 | Strangmar et al. | 428/368 |
| 4,702,960 | 10/1987 | Ogmar | 428/367 |
| 4,859,503 | 8/1989 | Bouix et al. | 428/408 |

Primary Examiner—Ellis P. Robinson
Assistant Examiner—Archene A. Turner
Attorney, Agent, or Firm—Thomas D. Linton; David O'Reilly

[57] ABSTRACT

A silicon carbide product by converting carbon preforms by utilizing a reactor apparatus (10) adapted for continuously producing molten, solar grade purity elemental silicon by thermal reaction of a suitable precursor gas, such as silane ($SiH_4$), is disclosed. The reactor apparatus (10) includes an elongated reactor body (32) having graphite or carbon walls which are heated to a temperature exceeding the melting temperature of silicon. The precursor gas enters the reactor body (32) through an efficiently cooled inlet tube assembly (22) and a relatively thin carbon or graphite septum (44). The septum (44), being in contact on one side with the cooled inlet (22) and the heated interior of the reactor (32) on the other side, provides a sharp temperature gradient for the precursor gas entering the reactor (32) and renders the operation of the inlet tube assembly (22) substantially free of clogging. The precursor gas flows in the reactor (32) in a substantially smooth, substantially axial manner. Liquid silicon formed in the initial stages of the thermal reaction reacts with the graphite or carbon walls to provide a silicon carbide coating on the walls. The silicon carbide coated reactor is highly adapted for prolonged use for production of highly pure solar grade silicon. Liquid silicon (20) produced in the reactor apparatus (10) may be used directly in a Czochralski or other crystal shaping equipment.

9 Claims, 2 Drawing Sheets

SILICON CARBIDE PRODUCT

CROSS-REFERENCE

This application is a division of application Ser. No. 07/153,126 filed Feb. 8, 1988 which is a continuation-in-part of application Ser. No. 749,661 filed June 28, 1985, and a continuation-in-part of application Ser. No. 618,712 filed June 8, 1984. Application Ser. No. 749,661 is in turn a continuation-in-part of application Ser. No. 390,920 filed June 22, 1982. Application Ser. No. 618,712 is a division of said application Ser. No. 390,920.

BACKGROUND OF THE INVENTION

1. Field of the Invention

The present invention is directed to a silicon carbide product made by coating or conversion of a carbon preform as disclosed in application Ser. No. 07/153,126, filed Feb. 8, 1988. The process and apparatus disclosed in application Ser. No. 07/153,126 filed Feb. 8, 1988 readily produces silicon carbide conversions and coating in depth with almost imperceptible change in dimensions of the product.

2. Description of the Prior Art

This invention relates to silicon carbide coated products and silicon carbide converted products that are produced with a no growth characteristic by conversion of carbon preforms using the Levin process, as disclosed in U.S. Pat. Nos. 4,871,587 patent application Ser. No. 07/153,126. "No growth" here refers to an insignificant increase in outer diameter, inner diameter, or any other dimension due to the conversion process. The term "no growth" was first applied, described in importance, and circumscribed in usage by Montgomery et al, U.S. Pat. No. 2,677,627, May 1954, in applying silicon carbide coating to graphite.

Crystalline graphite and amorphous carbon possess properties of adsorption and porosity that cause them to be highly favorable materials for conversion to SiC by the Levin process. The carbons (and SiC also) are strongly wetted by liquid silicon. Graphite and amorphous carbon are intrinsically porous and permeable to liquids and gases. The porosity can vary considerably with the method of fabrication and can exceed 30 volume percent. It is the major source of density deficit (the ideal specific gravities being 2.26 for graphite and 2.1 for amorphous carbon). In conventional machineable graphite materials, the accessible pores are in the 1 to 20 micrometer-size range.

Like amorphous carbon and graphite, silicon carbide (SiC) has a low coefficient of thermal expansion, excellent thermal stress resistance, and moderately good thermal and electrical conductivity. It melts above 4800 F.

In contrast to amorphous carbon and graphite, SiC possesses an extreme hardness (Knoop hardness about 2800, next to diamond and one form of boron nitride). Hence it is extremely abrasion-resistant, even at high temperature. Its bond strength at 2500° F. is about the same as at room temperature. These properties indicate important uses for SiC, well beyond the uses of amorphous carbon and graphite, especially at high temperature.

Unfortunately, SiC materials are brittle and are extremely difficult to machine. Therefore, they are difficult and costly to shape into intricate and delicate configurations. On the other hand, in the form of graphite, carbon bodies are readily machineable into intricate objects with dimensional exactitude.

It is a matter of considerable interest, then, that carbon can be converted to SiC by the Levin process in a no growth mode. For example, in the actual converting of carbon crucibles, the aforesaid process has demonstrated that it can readily produce silicon carbide conversions in depth with almost imperceptible change in dimensions of the product.

Therefore, amorphous carbon or graphite bodies — as preforms that have already been machined — offer a path to provide industry with SiC products that have a high degree of intricate detailing, dimensional exactitude, dimensional stability, bond strength, and abrasion resistance, even at temperatures as high as 2500 F.

For conversion to SiC by the Levin process, the starting material can be chosen form a widely available variety of carbon preform materials, whose differences in density, porosity, and permeability carry over to the finished product.

The no growth characteristic points directly to important high-temperature flight applications. These include engine turbine blade fabrication (where conversion can be carried out to considerable depth) and engine nozzles (where only surface coating need to be made).

The SiC conversion can be applied to provide delicately shaped products such a cog wheels, electrical components, and even carbon filaments, that retain original dimensions and at the same time impart superior mechanical properties. Carbon filaments (or meshes) for composite use can be converted almost entirely to SiC rather than be layered with the deposit of pyrolytic material that results from other processes.

In powder technology, SiC powders converted from carbon particles can find important applications. Examples are inclusion into aluminum matrices for enhanced stiffness and lightness and sintering into structural devices, such as high temperature heat exchangers, ceramic seals and electrical substrates.

Products of silicon carbide are especially important to the evolving semiconductor chip and solar cell technologies. SiC substrates (in place of silicon) have been successfully exposed to working temperatures as high as 650 C. and finding important uses in high-temperature, high-power, high-frequency rectifier diodes. The capability of SiC for high-temperature resistance, heat dissipation, and rapid switching suggest uses in density-packed, high-speed computers and even in hot engines as sensors. Amorphous SiC (which can probably be made from amorphous carbon powder) is finding applications in doping and modifying energy gaps to increase the efficiency of photovoltaic devices. It appears that many of the diverse intricately patterned preforms required for semiconductor chips and solar cells can be fabricated form carbon and converted to SiC by means of the Levin process. The making of requisitely thin SiC plate is included.

Both Montgomery el al and Levin teach, by means of entirely different processes, that it is unnecessary as a first step to lay down a layer of pyrolytic carbon in order to coat an amorphous carbon or graphite object with SiC. Both teach that a carbon preform can be coated in depth with little or no change in dimension. Thus both have as a prime objective the nogrowth application of SiC to carbon bodies.

Montgomery et al nozzles were found to be coated with silicon carbide inside and outside to a depth of 0.020" to 0.030". However, outward surface growth of 0.002" to 0.003" on a radius was also reported, but deemed to be easily compensated for in design.

In the Levin products, both the coating and the more extensive conversion to SiC within the preform are enabled by strong wetting and permeation of amorphous carbon and graphite, and even of the newly formed SiC, by liquid silicon in the pores of the preforms. In brief, accessibility for reaction is provided by strong adsorption in the multifarious pores intrinsic to the carbon. The reaction of carbon and liquid silicon at temperatures above 1500 C. is extremely rapid to give SiC. Nothing is lost from the original carbon structure by the replacement of a C by a larger SiC. Indeed, there results a considerable filling of voids, along with an increase in density.

On the other hand, the product of the Montgomery et al process results from reactions summarized by Montgomery et al (p. 3, lines 38-39) as:

$$SiO_2 + 3C = SiC + 2CO.$$

Perforce, the reaction is disruptive of the surface, since two C atoms are converted to gaseous CO and carried away from the surface. A third C atom reacts with gaseous silicon monoxide (SiO) to give SiC, which is attached to the structure. (SiO is thermodynamically more stable than gaseous $SiO_2$ at the 2350 C. reaction temperature.) A significant increase in void space results, along with a decrease in density. Because of the loss of two carbons per conversion, bond strength and abrasion resistance, predictably, should not be as good as the products of the Levin process.

Necessarily then, the inventive products of the two processes are appreciably different in microscopic appearance, physical properties, and capabilities.

Other great difference in process reflect very disparate costs, as well as quality, of comparable finished products. These important difference are give as follows:

Montgomery et al first charges the reactor with the reactant sand ($SiO_2$) in a reservoir separated by a buffer from the work load (the preforms to be coated) and then operates the reactor at a temperature above 2300 C. at power levels above 200 KW for two to three hours to produce a 0.02" to 0.03" SiC coating. (It can be shown that at thermodynamic equilibrium the $SiO_2$ becomes predominantly SiO gas, which along with released $O_2$, reacts with the carbon.)

In contrast, the Levin reactant — silane, a halosilane or a halosilicon — is in the gas phase and is fed in a controlled manner into the reactor during operation at a temperature within a range of only 1500° C. to 1800° C. at a power level of 50 KW or below. The reactant at reactor temperature is nascent elemental silicon formed by thermal decomposition or thermochemical reaction of precursor material. (Even the most stable of the precursor materials, for example silicon tetrachloride, begins to decompose at about 800° C. to yield elemental silicon.)

The Levin process applies SiC coatings in depth to carbon crucibles placed inside the reactor (and to the internal graphite reactor walls themselves) in less than 10 minutes of run time at 1625° C. to 1750° C., as manifested by an acquired surface abrasion resistance that is characteristic of SiC. The in-depth coating is enabled by the strong wetting of amorphous carbon and graphite and newly formed silicon carbide by liquid silicon in the pores of the preform bodies. The reaction of C and Si to give SiC is extremely rapid above 1500 C.

The short time and low temperature requirements of Levin in comparison to Montgomery et al can be an important advantage over Montgomery el at in greatly reducing surface growth, since growth is a function of the reaction temperature and of the time that the preform is at reaction temperature.

SUMMARY OF THE INVENTION

It is an object of the present invention to provide an apparatus and process for the efficient continuous production of molten silicon from a suitable silicon containing precursor gas.

It is another object of the present invention to provide an apparatus for the continuous production of molten silicon which readily withstands prolonged exposure to molten silicon.

These and other objects and advantages are attained by a reactor apparatus wherein a substantially smooth flow of a suitable silicon containing precursor gas is maintained in a substantially axial direction in an elongated reactor heated to a temperature above the melting temperature of elemental silicon. Thermal reaction of the precursor gas directly yields molten silicon which flows down on the walls of the reactor to be removed from a bottom thereof in the liquid state.

According to the process of the present invention a septum allows the use of a large inlet orifice and low velocity entrant flow and thereby more fully utilizes the upper regions of the reactor chamber for silicon conversion. By means of its insulating, high emissivity thermal properties, the septum eliminates the possibility of brown powder deposition on a relatively cooler surface, which is the starting step in the plugging of the inlet orifice.

In known silane decomposition processes, solid submicron silicon is formed and can cause plugging where small orifices and cooled surfaces are present.

In important distinction from the process described in U.S. Pat. No. 4,343,772, the present inventive process permits use of a reactor of any length since no toroidal flow is needed.

In accordance with one aspect of the present invention, an inlet tube of the reactor which injects the precursor gas into the reactor is efficiently cooled to prevent thermal formation of silicon prior to entry of the precursor gas into the reactor. One side of a relatively thin septum attached to the inlet tube is substantially in the same temperature range as the inlet tube, while the other side of the septum is exposed to the interior of the reactor and is substantially in the same temperature range as the reactor. As a result, the precursor gas entering the reactor is subjected to a very quick transition in temperature with substantially total avoidance of clogging the inlet tube by formation of a solid silicon plug.

The precursor gas is admitted to the reactor at comparatively low velocity, the very high inlet velocities not being required as set forth or implied in U.S. Pat. No. 4,343,772. A suitable range of velocities for the present invention is 1 to 50 feet per second, preferably 1 to 10 feet per second, more preferably 3 to 10 feet per second. Thus for the 157 cm by 7.6 cm cylindrical reactor described more fully below, a 1.0 cm inlet orifice, for example, may be used rather than the 0.15 cm injector probe exit orifice set forth by U.S. Pat. No. 4,343,772. This larger opening is a factor in permitting operation of the reactor without clogging. Furthermore, the inlet orifice of the invention may be positioned at the top center of the reactor, e.g. further from the vertical walls of the reactor. This is of course contrary to the description of U.S. Pat. No. 4,343,772, which places the gas outlet tube (the vortex finder) at top center and the gas inlet tube off center and which requires a gas inlet flow tangential to the vertical wall of the reactor at a velocity high enough to produce swirl and sustain a double-vertical flow pattern in the reactor.

The septum of the inventive process is small in size but has a large and critical role. The septum introduces a precursor gas such as silane which begins to change to solid silicon at about 325° C. into a reactor at temperatures above the melting point of silicon without the occurrence of solid plugging of the gas entry and other untoward effects. The septum is preferably round and wafer-shaped, with a central hole and is preferably made of high porosity carbon. For this reason, highly preferred carbon is Union Carbide Corporation's Carbon 60.

One face of the septum device of the invention "sees" very high temperatures within the reactor where radiation heating controls decomposition of precursor gas and melting of silicon. The other face of the septum is in contact with the relatively cooled gas inlet tube. Preferably the septum is in face-to-face contact with the gas inlet tube so that the inside diameter holes are matched for smooth gas flow. Thus the septum must be made from a material which has a high emissivity such as carbon or graphite. Other high emissivity materials such as silicon carbide may also be used. Emissivity is the relative power of a surface to radiate heat; i.e., the ratio of the energy radiated by a surface compared to a black body perfect radiator (at the same temperature). The septum of the invention has an emissivity greater than 0.90, preferably greater than 0.95. With such a septum, the process of the invention may be carried out such that fine brown silicon powder cannot deposit stably on the septum surface. Preferred materials are carbon and graphite.

The septum of the invention is formed of a material which has a high insensitivity to thermal shock. The septum or partition, is positioned such that one face is in contact with a prodigious heat sink and the opposite face a prodigious heat source. The septum is sufficiently thin that the gas passes through it rapidly enough so that it does not permit decomposition of the silane before the silane enters the reactor. That is, one face of the septum contacts and covers the flat end face of the gas inlet tube and the other face of the septum preferably sits flush with the reactor chamber top inner wall and constitutes a part of the top wall. Only the thickness of the septum separates the gas inlet tube from the reaction chamber coaxial with it. In the reactor environment where radiation is the main mode of heat transfer, the emissivity of the septum face is comparable to that of the reactor walls. The septum must be kept of a sufficiently small thickness that silane can pass quickly through it without decomposing during the passage. Depending upon the size of the reactor, the precursor gas, and the flow rate of the gas, a suitable range of thickness for the septum is about 0.1 cm to 1.0 cm., preferably 0.2 cm to 0.4 cm; and the diameter of the septum hole may range from 0.5 cm to 3.0 cm.

In accordance with another aspect of the present invention, the walls of the reactor are made of graphite or carbon material which have been discovered to be quickly coated (converted) during the initial exposure of the reactor to liquid silicon with a highly stable silicon carbide layer. Thus, the walls of the reactor, including that portion formed by the septum, quickly become converted to a material which is vastly superior in its ability not to adversely affect the purity of the formed silicon product.

According to the process of the invention, a decomposable precursor gas such as silane enters into a preferably vertical, cylindrical reaction chamber at moderate velocity after passing through a cooled gas inlet tube and the septum in tandem. The precursor gas, upon entering the reactor, has bean heated to a temperature only a few degrees above its reservoir temperature and well below its decomposition temperature even though the reactor is operated at temperatures above the melting point of silicon.

Where other silicon-containing material such as trichloro silane, silicon tetrafluoride, or silicon tetrachloride is used is used in the precursor gas composition, the composition may be introduced at a higher temperature which is below the decomposition temperature of the silicon-containing gas. Of course, coreactant (reductant) gases, carrier gases and diluent gases may also be used in such compositions. Thus the difference between the temperature of the precursor gas composition at entry and the temperature of the reaction chamber may be smaller when other silicon-containing gases are used. For example, $SiCl_4$ could be presented to the reaction chamber at 1000° C. without significant gas decomposition prior to entry into the reaction chamber.

The reactor is preferably coaxial with the inlet tube and septum, and preferably incorporates the septum with its inner wall at top center. Its component and posit relationship is highly advantageous to the successful entry or a readily decomposable, solid-producing gas into an extremely reactor without plugging, stress cracking, or otherwise disrupting the reactor operation.

Upon entering the reactor, the precursor material is subjected to a very quick temperature transition but is maintained in an approximately axi-symmetrical manner of flow down the reactor. The precursor gas heats up and to produce chemical vapor deposition (CVD) silicon on the wall and fine powder silicon in the reactor free space with byproduct hydrogen gas or other byproduct gas depending upon the precursor gas. Also, a carrier or diluent gas such as hydrogen may be transferred through the reactor. The CVD silicon and the powder silicon rapidly liquefy under the intense radiant heat within the reactor. The hydrogen gas and possibly unreacted precursor gas exit near the bottom of the reactor to this version of the configuration of the reactor and the species of precursor gas. The liquid silicon collects an maintained in liquid phase in a reservoir at the bottom of the reactor. The liquid may be drained out of the reactor either continuously or on demand.

In a preferred embodiment, the reactor is tall-formed, right-cylindrical vessel. It uses carbon or graphite inner walls. The first-made silicon reacts rapidly with the of the inner wall and converts it to silicon carbide. Thereafter, liquid silicon flows down the walls and collects in the reservoir during operation. The gas inlet tube is seated vertically on the septum and coaxially with the reactor to provide a gas flow vertically down the reactor.

The features of the present invention can be best understood, together with further objects and advantages, by reference to the following description, taken

DESCRIPTION OF THE PREFERRED EMBODIMENT

A preferred embodiment of the invention is a process for directly producing molten silicon, said process comprising the steps of:

(a) passing a stream comprising silane gas below the decomposition temperature of silane through a high emissivity, thin, insulating septum into a non-contaminating reaction chamber above the melting point of silicon, said thin septum having one face below the decomposition temperature of silane and an opposite face exposed to said reaction chamber, whereby said silane gas is decomposed directly to molten silicon in said reaction chamber;

(b) removing a stream of decomposition hydrogen gas and any unreacted silane from said reaction chamber; and (c) recovering product molten silicon from the bottom of said reaction chamber.

A preferred embodiment of the invention is also a process for directly producing molten silicon by thermal reaction of a silicon-containing precursor gas in a reaction chamber, the process comprising the steps of:

maintaining said silicon-containing precursor in a first temperature range below the thermal decomposition temperature of said silicon-containing precursor gas;

maintaining the reaction chamber in a second temperature range above the melting point of silicon;

abruptly raising the temperature of said silicon-containing precursor gas from said first temperature range to said second temperature range by introducing said silicon-containing precursor gas into said reaction chamber from a cooled inlet means located outside said reaction chamber through a thin, high emissivity, insulating septum having one face against said cooled inlet means and having the opposite face exposed to said reaction chamber so that said silicon-containing precursor gas remains undecomposed until entering said reaction chamber;

maintaining a substantially smooth axial flow of said silicon-containing precursor gas in the reaction chamber while permitting said silicon-containing precursor gas to undergo thermal decomposition to yield molten silicon;

removing unreacted precursor gas and by-product gas from the reaction chamber, and recovering molten silicon from the reaction chamber.

The following specification taken in conjunction with the drawings sets forth the preferred embodiment of the present invention in such a manner that any person skilled in the chemical arts can use the invention. The embodiment of the invention disclosed herein is the best mode contemplated by the inventor for carrying out his invention in a commercial environment, although it should be understood that various modifications can be accomplished within the parameters of the present invention.

Figure 1:
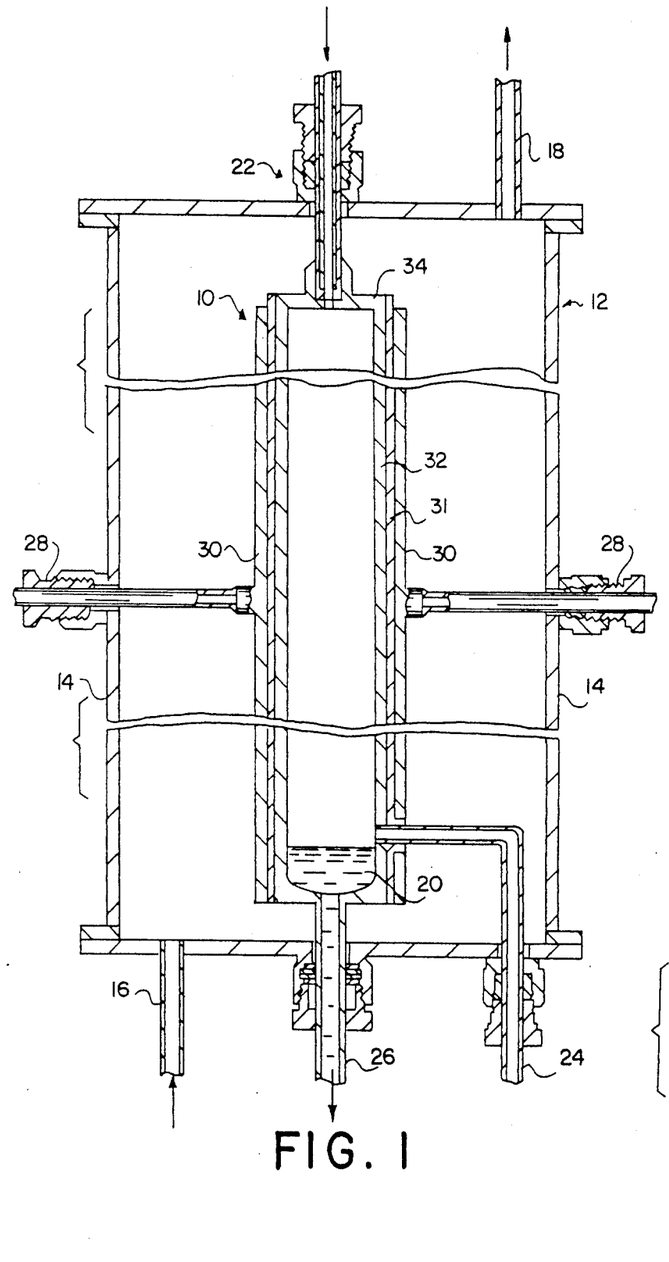
FIG. 1 is a schematic cross-sectional view showing the reactor apparatus of the present invention enclosed in an outer cylinder.
Figure 2:
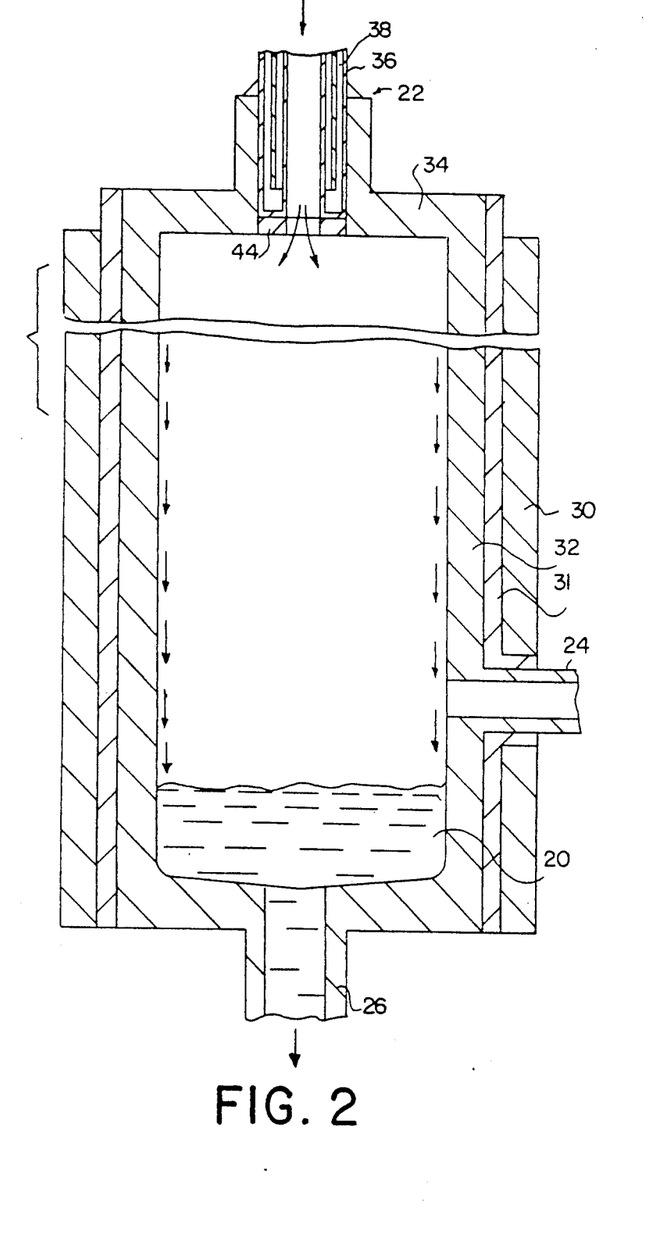
FIG. 2 is a schematic cross-sectional view showing the reactor apparatus of the present invention.

Referring now to the drawing Figures and particularly to the schematic cross-sectional views of FIGS. 1 and 2, the reactor apparatus 10 of the present invention is disclosed. The reactor apparatus 10 of the present invention is adapted for producing high purity molten silicon in a continuous process by thermal reaction of a suitable silicon containing precursor gas composition. Several known chemical reactions may be utilized in the novel process practiced in the reactor apparatus 10. For example, silicon may be produced in the apparatus 10 by reduction of silicon tetrachloride ($SiCl_4$) or trichlorosilane ($SiHCl_3$) with hydrogen ($H_2$) in accordance with Equations II and III respectively.

$$SiCl_4 + 2H_2 \longrightarrow Si + 4HCl \quad \text{Equation II}$$

$$SiHCl_3 + H_2 \longrightarrow Si + 3HCl \quad \text{Equation III}$$

However, the apparatus 10 and process of the present invention is designed most advantageously for continuous production of silicon by thermal decomposition of silane gas into silicon and hydrogen gas in accordance with Equation I (set forth above). Therefore, the following exemplary description principally describes the utilization of the thermal decomposition reaction of silane in the novel apparatus and process of the present invention. Furthermore, hereinafter the term "precursor gas" is interchangeably used with the term "silane," and the term "by-product gas" is interchangeably used with the term "hydrogen." Nevertheless, it should be kept in mind that in the event the process of the present invention utilizes alternative chemical reactions (such as the reactions of Equations II or III), the precursor gas may be other than silane, and the by-product gas or gases may be other than hydrogen.

Referring now principally to FIG. 1, the reactor apparatus 10 of the present invention is shown mounted in a suitable outer cylinder 12. The principal purpose of the outer cylinder 12 is to contain the reactor apparatus 10 in an inert gas atmosphere while the reactor apparatus 10 is heated to high temperatures. The outer cylinder 12 may be constructed substantially in accordance with the state-of-the-art. The outer cylinder 12, of course, also provides thermal insulation for the reactor apparatus 10, and for that purpose walls 14 are made of stainless steel encasing suitable insulating materials (not shown) which surround the reactor apparatus 10. Inlet and outlet tubes for the inert gas, which is preferably argon, are schematically shown on FIG. 1 and bear the reference numerals 16 and 18, respectively.

The protective outer cylinder 12 also has suitable inlet ports for ducts carrying the precursor gas, the by-product gas, and the reaction product, molten silicon 20. On the schematic view of FIG. 1, the inlet duct assembly for the precursor gas silane bears the reference numeral 22, the outlet duct for the by-product hydrogen the reference numeral 24, and the outlet duct for molten silicon the reference numeral 26. Finally, the outer cylinder 12 is provided with suitable entry ports for copper or like conduits 28 which conduct current for energizing graphite "picket fence" type resistance heaters 30 surrounding the inner reactor apparatus 10. The resistance heaters 30 and the inner reactor 32 are separated from one another by a high-temperature-resistant electrical insulator 31.

Referring now principally to the schematic cross-sectional view of FIG. 2, the inner reactor apparatus 10 is disclosed in detail. The reactor apparatus is an elongated hollow body; preferably, as is shown in the herein-described preferred embodiment, it is a hollow cylindrical body the length of which greatly exceeds its diameter. In a specific example of the reactor apparatus 10 of the present invention, the cylindrical reactor body or reactor 32 is 157 cm long, and has an inner diameter of 7.6 cm. The length-to-width ratio of the reactor may vary over a wide range so long as molten silicon is produced and decomposition gas is removed. A suitable range is at least about 2:1 or higher. The relative length.-to-width ratio of the reactor 32 is designed to provide a sufficiently long dwelling time for the gaseous reactants in the reactor 32 to reach thermodynamic equilibrium, which, under the conditions prevailing in the reactor 32, favors high yields of elemental silicon. In fact, in the apparatus of the present invention, silane gas is converted in substantially one hundred percent (100%) yield to silicon.

In the cyclone apparatus of U.S. Pat. No. 4,343,772 the length-to-width ratio is limited to optimum length dictated by reverse flow considerations. Additional length therein is ineffective and nonproductive. The throughput of the present invention is not so limited.

In accordance with one important aspect of the invention, the reactor 32 is made of highly pure graphite or carbon material which rapidly reacts under the conditions prevailing in the reactor 32 with silicon to form silicon carbide (SiC). In fact, it was found in experience that the silicon formed in the initial stages of the operation of the reactor apparatus 10 is substantially consumed to react with the inner walls of the reactor 32. The resulting silicon carbide coating on the reactor walls is highly wettable by molten silicon, and is yet highly resistant to molten silicon. This is a very advantageous feature of the reactor apparatus 10 of the present invention, because it permits the formation of highly pure solar grade silicon substantially uncontaminated by material dissolved from the reactor walls.

For comparison, it is noted that liquid silicon is known in the art to be highly reactive and is often termed "universal solvent." In fact, most prior art silicon crystal pulling apparatus struggle with the problem of keeping molten silicon sufficiently free of impurities formed when the liquid silicon reacts with, dissolves, or diffuses impurities out from the walls of a crucible, capillary die, or the like. The present invention, however, completely solves this problem by providing the readily available graphite or carbon reactor material, which during the process of the invention "self-converts" into the highly durable and liquid-silicon-resistant silicon carbide. The initial stage of converting the carbon walls of the reactor 32 into silicon carbide is termed "priming" of the reactor.

Heating of the reactor body 32 is accomplished by the "picket fence" type resistant heaters 30 which surround the reactor body 32. In alternative embodiments of the reactor apparatus 10 of the present invention, other methods of heating may be utilized. The only critical feature of the invention regarding heating is that the interior of the reactor 32 and the interior walls are maintained above the melting temperature of silicon (1412° C.) during the process of silicon production. Preferably, the interior of the reactor 32 is maintained above 1500° C., and most preferably it is maintained approximately between 1600° to 1800° C. At the operating temperatures of the reactor apparatus 10 (i.e., above 1412° C.), the thermal decomposition of silane gas into silicon and hydrogen is extremely rapid. Furthermore, at this temperature the thermodynamic equilibrium favors formation of elemental silicon with substantially one hundred percent (100%) yield.

Actually, the above-noted upper limit of approximately 1800° C. is not a limit of the process of the present invention, because the process may be practiced at still higher temperatures. Rather, approximately 1800° C. is the upper limit of temperature that the materials of the reactor apparatus 10 of the present invention can withstand without damage in indefinite continuous operation.

With regard to the above-noted temperature ranges of the process of the present invention, it is further noted that conversion of the carbon o graphite walls of the reactor 32 to silicon carbide occurs below 1300° C. too slowly to have any practical effect on priming the reactor 32. Therefore, in the prior art reactors operating at temperatures below 1300° C., the very advantageous "priming" of the reactor does not occur to a useful extent.

Experience proved the reactor apparatus 10 of the present invention to be capable of withstanding repeated temperature cycling between ambient temperature (nonoperational time of the reactor) and 1400°-1800° C. (operation).

CVD silicon is formed on the walls of reactor 32 and fine silicon powder is formed in the free space within the reactor. Residence time within the reactor environment is sufficient to melt the fine powder silicon and transport it to the walls or directly to the reservoir of liquid silicon at the bottom of the reactor 32. In very short versions of the reactor, the melting of the powder may be aided by a transverse filter or a baffle intercepting the powder stream within the reactor so that little or no silicon powder can escape the reactor.

The silicon formed in the reactor 32 is in the molten phase, and flows down the silicon carbide interior walls of the reactor 32 to collect in the bottom thereof. In a preferred operation, pure, solar grade molten silicon is drained from the bottom of the reactor 32 and is advantageously utilized, without being allowed to solidify, in a Czochralski or other crystal shaping equipment (not shown) to provide silicon ingots or ribbons (not shown).

Preferably, the reactor apparatus 10 is disposed in a substantially upright position, as is shown on FIGS. 1 and 2, so that flow of the molten silicon 20 on the reactor walls is gravity induced. The reactor is preferably operated with a smooth axial flow of the precursor gas composition from the top toward the bottom of the reactor. Alternatively, the gas could be flowed from the bottom toward the top of the reactor and molten silicon flows downwardly to collect at the bottom of the reactor.

Figure 3:
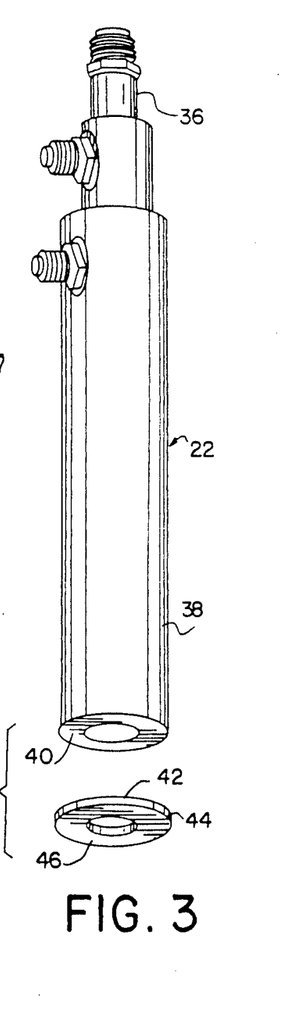
FIG. 3 is a schematic perspective view showing a precursor gas inlet tube assembly to be incorporated in the reactor apparatus of the present invention.
Figure 4:
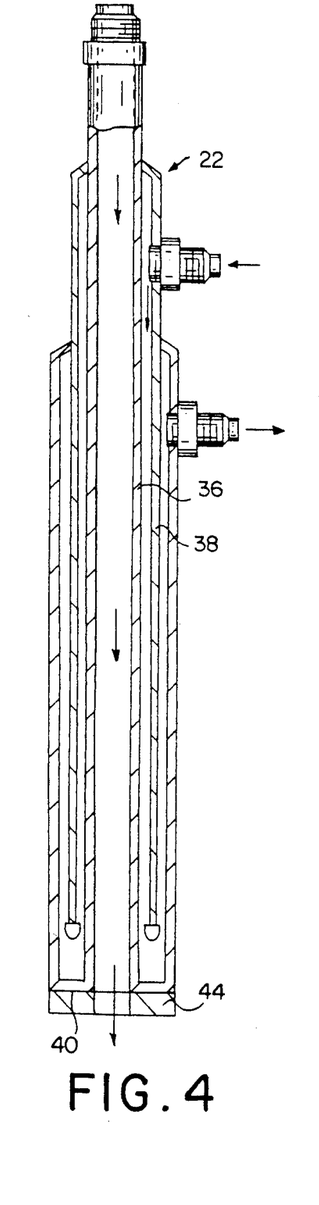
FIG. 4 is a cross-sectional view showing the precursor gas inlet tube assembly to be incorporated in the reactor apparatus of the present invention.

Referring now principally to FIGS. 3 and 4, the silane gas inlet duct or tube assembly 22 is disclosed in detail. The inlet tube assembly 22 is particularly adapted and highly suited for supplying silane ga into the reactor 32 in a continuous and substantially nonclogging manner. As is shown on FIG. 2, the inlet tube assembly 22 is disposed substantially in the center of a top wall 34 of the reactor 32 in such a manner that the inlet tube assembly 22 is located outside of the heated interior space of the reactor 32.

The inlet tube assembly 22 comprises an elongated inlet tube 36 which is connected to a supply of silane gas. The inlet tube 36 is surrounded by a jacket 38 wherethrough a cooling medium, such as water, is circulated. The end of the inlet tube 36 and the end of the jacket 38 together form a substantially flat substantially ring-shaped surface 40.

The ring-shaped surface 40 of the inlet tube assembly 22 is not directly exposed to the interior of the reactor 32. Rather, it is in contact with one side 42 of a carbon or graphite septum 44. The septum 44 comprises a relatively thin ring-shaped body which substantially conforms to the shape of the end of the inlet tube assembly 22. A second side 46 of the septum 44 is substantially flush with the interior surface of the top wall 34 of the reactor 32, as is shown on FIG. 2.

The septum 44 insulates the inlet tube 36 from the high temperature of the reactor 32 and causes the silane gas which enters the reactor 32 to experience a very sharp temperature gradient. This is because one side 42 of the septum 44 is in contact with the efficiently cooled surface 40 of the inlet tube 36 and jacket 38, and is substantially in the same temperature range as the inlet tube 36. The other side 46 of the septum 44 is exposed to the heated interior of the reactor 32, and, being of a dark high emissivity material (porous carbon), is substantially in the same temperature range as the interior of the reactor 32.

During the process of the present invention, silane gas is continuously fed through the inlet tube assembly 22 into the reactor 32. The inlet tube assembly 22 is vigorously cooled by water circulated through the cooling jacket 38. In accordance with one important aspect of the present invention, the temperature of the silane gas introduced into the reactor 32 through the inlet tube 36 is kept at a temperature below 300° C. This is for the purpose of avoiding any significant thermal decomposition of the silane gas prematurely, before entry of the silane gas into the reactor 32. In order to facilitate efficient cooling of the inlet tube assembly 22, the inlet tube 36 and the jacket 38 are made of a material of high thermal conductivity, such as copper.

A wide range of smooth, laminar flow rates are usable according to the process of the invention. The flow rate should be at least enough to provide a reasonable throughput for the reactor and not so high as to cause cool zones or cool portions of reactor wall. Also the flow rate should not be so high as to interfere with removal of molten silicon from the bottom of the reactor and withdrawal of decomposition and other gases. A suitable flow rate for the gas is at least 0.02 cubic feet per minute (cfm) (0.6 liters gas per minute) STP up to a maximum flow rate, depending on the size of the reactor, wherein the operation of the reactor is not affected. A suitable range of linear gas velocity is about 1.0 to 50 feet per second (fps) most preferably 3 to 10 fps.

The relatively thin septum 44 of carbon or graphite is highly effective in avoiding thermal precipitation of fine solid silicon particles on the inlet surfaces and ensuing clogging of the inlet tube and the narrow septum 44 itself. Experience has shown that during the "priming" stage of the operation of the reactor apparatus 10, the septum 44 too reacts with the newly-formed liquid silicon to form silicon carbide, without impairing its emissivity.

The inlet tube assembly 22 of the reactor apparatus of the present invention operates without clogging. In contrast with the prior art inlet assembly disclosed in the above-noted U.S. patent application Ser. No. 126,063, now U.S. Pat. No. 4,343,772 the internal diameter of the inlet tube 36 may be quite substantial. In the herein-described specific example wherein the length of the reactor is 157 cm, the internal diameter of the inlet tube 36 is approximately 1 cm, and the inside diameter of the abutting septum 44 is approximately 1 cm. The outside diameter of the septum 44 is 2.2 cm and its thickness is about 0.3 cm.

Dwelling time of the silane gas in the heated reactor 32 is selected in such a manner that the silane-to-liquid silicon reaction proceeds to substantially reach thermodynamic equilibrium which favors complete decomposition. During the process, the silane gas and the by-product hydrogen gas flow in a substantially smooth, substantially unperturbed flow, substantially axially in the reactor 32. The lower, reservoir portion of the reactor 32, containing molten silicon 20, is kept at a temperature exceeding the melting temperature of silicon. The molten silicon may be continuously drained out of the reactor apparatus 10 through the outlet duct assembly 26 which may be constructed in accordance with stat of the art. The by-product hydrogen gas leaves the reactor 32 through the hydrogen outlet duct assembly 24 which is located on a side wall of the reactor 32 above the level of molten silicon 20. Assembly 24 is located near the bottom of the reactor 32 (above the maximum level of molten silicon 20) so that gas flow is essentially from top to bottom. Alternatively, the gas outlet tube may extend upward from the bottom of the reactor through the pool of molten silicon.

As indicated above, in one aspect this invention comprises the preparation of highly pure silicon by operation of the above-described reactor apparatus using a suitable silicon-containing precursor material other than silane. Such other silicon-containing precursor materials are exemplified by trichlorosilane, silicon tetrachloride and silicon tetrafluoride. Thus, such other materials contain halogen, or hydrogen and halogen bonded to silicon. As indicated by the suitability of both fluorine and chlorine compounds, the nature of the halogen bonded to silicon in the precursor materials is not critical. The compounds may contain other chemical species such as oxygen, in addition to hydrogen and halides. Furthermore, the halogen atoms may be alike, as indicated above; or alternatively, they may be different. Thus, for example, in precursor materials suitable for this invention, fluorine and chlorine both may be present in the same molecule bonded to silicon. If desired, the halogen-containing precursor materials can be admixed, or admixed with silane. Also, one precursor material can be used followed by use of another.

The preferred halogen-containing compounds utilized as precursor materials are available at a suitable cost. In this regard however, it is to be understood that the cost of a precursor material is an important, but not a critical, requirement of this invention.

A skilled practitioner will recognize a relationship between process temperature and precursor material employed as a gas. The process of this invention necessarily entails operation at temperatures above the melting point of silicon (1412° C.). Furthermore, as pointed out above, experience proved the reactor apparatus of the present invention is capable of withstanding repeated temperature cycling between ambient temperature (nonoperational time of the reactor) and 1400°-1800° C. Within these parameters, it is generally desirable to conduct the process of this invention at a temperature or temperatures at which thermodynamics favor thermochemical decomposition of the selected precursor gas or gases to essentially pure silicon.

Silicon-containing precursor materials other than silane can be used analogously to silane. Thus, the halosilane precursor used in this invention can be introduced with hydrogen via cooled tube inlet means through a septum having a thickness of about 0.1 to 1.0 centimeters thick, and a matching orifice of a diameter in the range of 0.5-3.0 cm. The emissivity of the spectrum can be 0.90 or higher. Preferably, the first temperature range is below 1200° C., more preferably below 1000° C. and the second temperature inside the reactor is approximately 1500°-1800° C., more preferably approximately 1600°-1800° C. The septum location is preferably at the top center of the reactor and the feed gas is preferably introduced at a rate of about 1.0 to 50.0 feed per second, more preferably at about 3.0 to 10.0 feet per second.

COMPARATIVE EXAMPLE

Four runs were made in which silane gas was fed out of room temperature storage through a cooled inlet tube and into a reactor, as described in U.S. Pat. No. 4,343,772. In all four runs, the reactor temperature was between 1600° and 1700° C. In the first three runs, the entry gas was 100% silane flowing at 0.1 cfm STP; in the fourth run, the gas was 20% silane, 80% hydrogen, at 0.25 cfm STP. Accordingly, gas discharge velocity from the inlet tube into the reactor varied from about 100 to 250 fps. Within the reactor, the positions of inlet tube and vortex finder were varied over the four runs and included the preferred positions of U.S. Pat. No. 4,343,772.

In each run, operation was terminated after 5 minutes due to excessive inlet gas pressure caused by complete or almost complete plugging of the exit of the inlet tube, as determined by pressure increase and confirmed later by visual examination. The inlet tube exit tip was seen covered with a plug, which was a gray, poorly consolidated mass of silicon, typically about 4 millimeters in length extending from the tip and weighing about 1 gram. Furthermore, the terminated runs were found to be near to failure due to a second cause: accumulation of a fine yellowish brown silicon powder in the vortex finder at its first constriction just above the reactor. Also, the top of the reactor, upon cooling, showed incipient cracks radiating from the off-center inlet tube.

In all the runs, there was no evidence of silicon collection at the bottom of the reactor, but there was some indication of conversion of graphite to silicon carbide at the reactor wall near the vortex finder, as shown by increased abrasion resistance. In the fourth run, brown silicon powder was recovered from the exit lines; and a mass balance was taken, which indicated that all of the silane had been decomposed and most of it converted to the brown silicon powder.

The loss of silicon powder was attributed to the location of the vortex finder near the top of the reactor where silicon particles initially form. At this location, the vortex finder can have a large tendency to sweep out freshly formed submicron powder entrained in the gas stream.

EXAMPLE

A gas composed of 20% silane and 80% hydrogen was provided to a vertical graphite reactor as described above for the invention and shown in the drawing figures, except that the reactor chamber was abbreviated to length 21 cm by 5 cm internal diameter, and except that a 1.9 cm-ID outlet tube extended axially downward out of the reactor from an open end 2 inches above the chamber bottom (to allow a pool of molten silicon to form at the chamber bottom and at the same time to allow the axisymmetric downward flow and discharge of gases and entrained powder through the outlet tube).

The silane/hydrogen mixture flowed into the reactor chamber from room temperature storage through a cooled, vertical inlet tube and through a 0.3 cm-thick porous carbon septum. The inlet tube had a 1.0 cm diameter gas flow channel, and the septum had a 1.0 cm central hole diameter — a very significant difference from the 0.16 cm-diameter of the aperture of the inlet tube of U.S. Pat. No. 4,343,772. One face of the septum concentrically abutted the flat end face of the inlet tube. The other face of the septum was central and flush with the top wall of the reactor. Emissivities of both the septum and the reactor wall were well above 0.9. The silane/hydrogen mixture flowed through inlet tube and septum at 0.25 cfm STP (at a velocity of about 5 fps) and entered the reaction chamber, which was heated by an external graphite resistance heater to about 1650° C. In the reactor, the silane decomposed completely (as evidenced by the color and luminoscity of a burn-off flame indicator at the exit of the apparatus); and hydrogen and entrained silicon powder entered the outlet tube and exited the bottom of the reactor.

The run was discontinued after 20 minutes because of increased pressure downstream of the reactor due to deposition of powdered silicon in the lines. This escape of most of the powdered silicon from the reactor was to be expected since the test reactor chamber was only 21 cm long and the effective reaction length was only 15 cm — a small segment actually of the preferred embodiment, which has been given as 157 cm in length by 7.5 cm ID. At full design length (157 cm, compared to 21 cm) no powdered silicon is expected to escape. In essence, the dwell time in the abbreviated reactor, about one second, was insufficient to accomplish completely the sequential steps of silane heating, pyrolysis, silicon powder generation, nucleation, particle growth, heating and melting. Nevertheless, the weight of the reactor increased by 10.1 grams due to in situ conversion of the graphite wall to silicon carbide, showing that "priming" of the reactor for liquid silicon collection was readily taking place.

The reactor was cooled, disassembled and inspected. The septum was clear, and there was no evidence of silicon powder deposit anywhere in the reactor. This 20-minute run conclusively demonstrated a plug-free inlet operation.

Following the general procedure of the above example, a high-purity silicon can also be obtained using the apparatus of this invention and other silicon-containing materials such as the halosilanes and the halosilicons, as exemplified by trichlorosilane, silicon tetrachloride and silicon tetrafluoride. The silicon-containing material can be heated to a temperature of 300°-500° C. or higher, and hydrogen to 1200°-1600° C. or higher in order that the resulting composition be gaseous prior to introduction into the reaction vessel.

It is thus seen that no change in length, shape, size, or operating conditions of the cyclone-type reactor of U.S. Pat. No. 4,343,772 can prevent the loss of submicron silicon powder such as we have due to the vortex finder influence of the gas stream in the prior art device. In comparison, the reactor of the invention can be operated with adequate dwell time of the silane gas by appropriately sizing the reactor to avoid any loss of submicron silicon powder by completely melting the silicon.

Principal advantages of the above-described reactor apparatus and process of the present invention include the following. The reactor 32 is readily manufactured of relatively inexpensive pure carbon or graphite material, and yet readily "primes" or converts itself to eventually expose only non-contaminating silicon carbide for contact with the highly pure, solar grade silicon. The reactor is capable of continuous, trouble-free operation, is not subject to clogging due to buildup of solid silicon material, and does not require continuous scraping or clearing operation to keep the walls free of deposited hard crust of silicon.

The above-described specific embodiment of the reactor apparatus 10 is capable of producing several kilograms (up to 15 kg) of solar grade molten silicon per hour. For a still larger scale silicon producing plant a still larger embodiment of the reactor apparatus 10 of the present invention may be utilized. Alternatively, and preferably, several reactors of approximately of the above-noted specific dimensions may be operated simultaneously.

Furthermore, and preferably in small versions of the reactor, the molten silicon chemically obtained in the process of the present invention may be directly fed into a Czochralski or other crystal shaping apparatus (not shown), eliminating the need for remelting of solid silicon. The energy saving thereby is considerable. Alternatively, the molten silicon may be used to produce castings for later remelt and replenishment of Czochralski or other apparatus.

This invention can be extended to the preparation of silicon carbide coatings of carbon or graphite objects or, alternatively to the preparation of silicon carbide articles of manufacture from carbon or graphite preform objects.

As indicated above, the reactor apparatus of this invention is made of highly pure graphite or carbon material which rapidly reacts under the conditions prevailing in reactor 32 with silicon to form silicon carbide. In fact, as mentioned above, it was found in experience that the silicon formed in the initial stages of the operation of reactor apparatus 10 is substantially consumed by reacting with the inner walls of reactor 32.

In order to prepare silicon carbide articles of manufacture in an embodiment of this invention, advantage is taken of the above-mentioned tendency of silicon to react with the reactor walls. To do so, one mounts or places one or more carbon or graphite objects, preferably of comparatively small size, within the chamber of reactor 32 and then conducts the process of this invention as above described, using a suitable silicon-containing precursor material to produce silicon inside reactor 32. During operation in this manner, silicon can contact the object or objects to produce a coating of silicon carbide for abrasion resistance which is highly desirable in nozzle throat applications. Alternatively, by purposeful variation of contact time, the silicon can convert the object or objects in depth partially or entirely to silicon carbide. A carbon core may remain, particularly if the object is relatively dense or thick. Additional excess silicon will wet the silicon carbide and be absorbed within the silicon carbide (or silicon carbide/carbon core) body. After converting the objects to the degree desired, the treatment process is stopped and silicon carbide-coated objects, or silicon carbide objects, or silicon carbide/silicon objects or silicon carbide/carbon core objects, or silicon carbide, silicon/carbon core objects are removed from the reactor. When excess or free silicon is desired to remain (as in silicon carbide/silicon objects), it provides the important advantage of filling the voids and forming a non-porous body.

For this embodiment, one can make modifications in the reactor apparatus to provide for high object-holding capacity and to allow more easy access to the interior of the reactor, thereby facilitating adding more parts to be coated by repeating the process described above. For example, outer cylinder 12 can be hinged to allow an operator to open a side of 12 and reach inner reactor 10. Suitable modifications of resistance heaters 30, insulator 31, and inner reactor 32 are also made to allow easy access to the interior of 32. Also, for example, heaters 30, insulator 31, and inner reactor 32 can be segmented above and below conduits 28, and the segmented parts "stacked" one on top of the other to provide the elongated hollow body shown in FIGS. 1 and 2. In addition, mounting stations for the objects to be coated can be added to the interior wall of 32.

It is to be understood that the batch process described above, provides objects that are coated with or converted to silicon carbide and silicon with little or no increase in dimension(s) of the object. This is an important feature of the invention, and is especially important when preparing objects for use in the electronic industries.

As an alternate to the batch process described above, automation of the loading, converting, and removing steps can be contemplated to take advantage of the continuous production of silicon carbide coatings or bodies provided by operation of the reactor apparatus of this invention.

Several modifications of the above-described apparatus and process may become readily apparent to those skilled in the art in light of the above disclosure. Therefore, the scope of the present invention should be interpreted solely from the following claims.

I claim:

1. A silicon carbide no-growth product comprised of a carbon or graphite object being converted to silicon carbide by being in contact with a silicon liquid and vapor for a preselected period of time and temperature sufficient to replace carbon (c) atoms with silicon carbide atoms to substantially fill all voids whereby an increase in the density of said converted carbon or graphite object is produced with substantially no growth.

2. The silicon carbide product according to claim 1 in which said carbon or graphite object is converted to produce a surface coating of silicon carbide.

3. The silicon carbide no-growth product according to claim 1 in which a carbon or graphite object converted to a silicon carbide object, said carbon or graphite object being in contact with a silicon liquid and vapor in a reaction chamber for a selected period of time; said silicon liquid and vapor being produced by passing a stream of gaseous precursor material through a hole within a high emissivity, thin, insulating septum into a reaction chamber, said gaseous precursor material being comprised of a silicon-containing material in a gaseous phase below the decomposition temperature of said gas selected from the group consisting of silane, halosilane, and halosilicon, and an accompanying gas having at least one of the properties of a co-reactant, a carrier and a diluent, said reaction chamber being maintained at a temperature above the melting point of silicon of at least 1412° C., said thin septum having one face below the decomposition temperature of said gas and an opposite face exposed to said reaction chamber, said silicon containing gaseous precursor material being decomposed directly to silicon in said reaction chamber; decomposition gas, unreacted gas, and diluent gas being removed in a stream from said reaction chamber; said carbon or graphite object being in contact with said silicon liquid for a period of time depending upon temperature, concentration of said gaseous precursor material, flow rate and porosity of said carbon or graphite object to convert said carbon or graphite object to a silicon carbide product with substantially no-growth; said silicon precursor material and co-reactant gas being supplied to said reaction chamber in an amount sufficient to allow an excess of free silicon to remain so that voids in said carbon or graphite are filled to produce a non-porous silicon carbide product when removed from said reaction chamber.

4. The silicon carbide product according to claim 3 in which said carbon or graphite object is in contact with said silicon liquid and vapor in a reaction chamber maintained at a temperature above 1500° C.

5. The silicon carbide product according to claim 4 in which said carbon or graphite object is in contact with said silicon liquid and vapor in a reaction chamber at a temperature in the range of 1500° C. to 1800° C.

6. The silicon carbide product according to claim 5 in which said carbon or graphite object is in contact with a silicon liquid and vapor produced by a flow rate of precursor material with said reaction chamber in the range of 1.0 to 50.0 feet per second.

7. The silicon carbide product according to claim 6 in which said precursor material flow rate is in the range of 3.0 to 10.0 feet per second.

8. The silicon carbide product according to claim 3 in which said halosilane gaseous precursor material is trichlorosilane.

9. The silicon carbide product according to claim 3 in which said halosilicon gaseous precursor is selected from the group consisting of silicon tetrafluoride and silicon tetrachloride.

* * * * *